United States Patent
Takase et al.

(10) Patent No.: US 12,248,270 B2
(45) Date of Patent: Mar. 11, 2025

(54) IMAGE FORMING APPARATUS INCLUDING PARTICULAR GEAR-SHAFT CONFIGURATION

(71) Applicant: CANON KABUSHIKI KAISHA, Tokyo (JP)

(72) Inventors: Kazuki Takase, Shizuoka (JP); Sachiyori Shiina, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/449,214

(22) Filed: Aug. 14, 2023

(65) Prior Publication Data

US 2024/0061368 A1 Feb. 22, 2024

(30) Foreign Application Priority Data

Aug. 22, 2022 (JP) ................. 2022-131867

(51) Int. Cl.
*G03G 15/00* (2006.01)
*F16H 35/18* (2006.01)
*F16H 57/00* (2012.01)

(52) U.S. Cl.
CPC ........... *G03G 15/757* (2013.01); *F16H 35/18* (2013.01); *F16H 57/00* (2013.01)

(58) Field of Classification Search
CPC .. G03G 15/757; G03G 21/1647; F16H 35/18; F16H 57/00
See application file for complete search history.

(56) References Cited

FOREIGN PATENT DOCUMENTS

| CN | 216555211 U | * | 5/2022 |
| JP | 2000039752 A | | 2/2000 |
| JP | 2010140060 A | | 6/2010 |

OTHER PUBLICATIONS

Machine translation of CN 216555211 U published on May 17, 2022.*

* cited by examiner

*Primary Examiner* — Sophia S Chen
(74) *Attorney, Agent, or Firm* — ROSSI, KIMMS & McDOWELL LLP

(57) ABSTRACT

An image forming apparatus includes: a driving source including an output shaft including a large diameter portion and a small diameter portion; a first gear including (i) a first portion provided with a first opening and (ii) a second portion provided with a second opening having a smaller diameter than that of the first opening, and (iii) gear teeth formed on an outer peripheral surface of the second portion, the first gear being mounted on the output shaft such that the large diameter portion is inserted into the first opening and the small diameter portion is inserted into the second opening; and a second gear that engages with the gear teeth of the first gear and is driven by the first gear. Rotation of the first gear with respect to the output shaft is restricted by at least a part of the large diameter portion.

16 Claims, 13 Drawing Sheets

|        | PARALLEL PIN HOLE EDGE | | CORNER R SHAPE P4 |
|---|---|---|---|
| FIG.6A | P3  | 1.10 | 1.04 |
| FIG.6B | P33 | 4.29 | -    |
| FIG.6C | P43 | 1.00 | -    |

STRESS FACTORS WHEN ASSUMING
PARALLEL PIN HOLE EDGE P43 IN FIG. 6C IS 1

*Fig.7B*

IMAGE FORMING APPARATUS INCLUDING PARTICULAR GEAR-SHAFT CONFIGURATION

BACKGROUND OF THE INVENTION

Field of the Invention

The present invention relates to an image forming apparatus.

Description of the Related Art

An image forming apparatus according to Japanese Patent Application Publication No. 2010-140060 includes a motor that drives a photosensitive drum (driven member), and a pinion gear mounted on a motor shaft (output shaft) of the motor.

The speed of printing can be increased if the rotation speed of the motor is increased, but increasing the speed of the motor increases the operation sound. A possible way of increasing the speed of printing while suppressing the operation sound is increasing the torque of the motor.

However increasing the torque applies a large load on the motor shaft. Therefore the shaft diameter of the motor shaft needs to be increased to enhance strength, but increasing the shaft diameter requires an increase in the outer diameter of the pinion gear mounted on the motor shaft. As a result, the peripheral speed of the pinion gear increases and the operation sound increases accordingly.

SUMMARY OF THE INVENTION

It is an object of the present invention that in an image forming apparatus having a driven member which is rotary-driven by power transmitted from a driving source, strength of the output shaft is ensured to be operated with high torque, while preventing the increase of the size of the gear, which is mounted on the output shaft of the driving source.

The present invention is an image forming apparatus configured to form an image on a recording material, including: a driving source including an output shaft that outputs power to be transmitted to a driven member, the output shaft including (i) a large diameter portion having a first outer diameter and (ii) a small diameter portion having a second outer diameter that is smaller than the first outer diameter; a first gear including (i) a first portion provided with a first opening having a first diameter and (ii) a second portion provided with a second opening having a second diameter that is smaller than the first diameter, and (iii) gear teeth formed on an outer peripheral surface of the second portion, the first gear being mounted on the output shaft such that the large diameter portion is inserted into the first opening and the small diameter portion is inserted into the second opening; and a second gear that engages with the gear teeth of the first gear and is driven by the first gear, wherein rotation of the first gear with respect to the output shaft is restricted by at least a part of the large diameter portion.

Further features of the present invention will become apparent from the following description of exemplary embodiments with reference to the attached drawings.

BRIEF DESCRIPTION OF THE DRAWINGS

FIG. 7B is a table indicating stress generated in the motor shaft 21a;

DESCRIPTION OF THE EMBODIMENTS

An image forming apparatus according to the present invention will be described in detail with reference to the drawings.

Example 1

Figure 1:
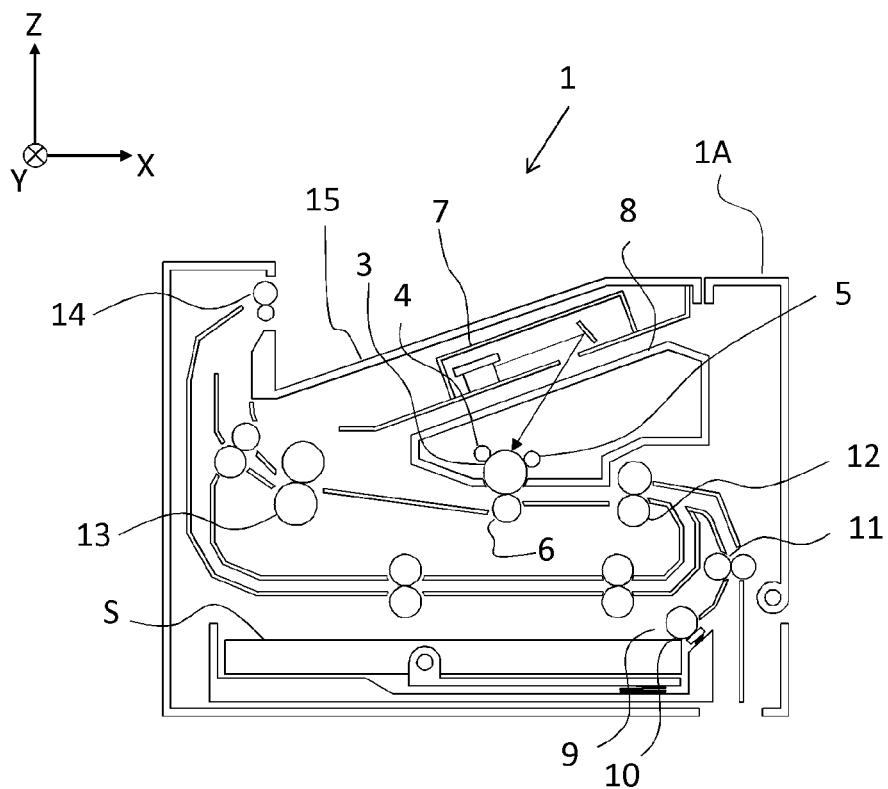
FIG. 1 is a schematic cross-sectional view of an image forming apparatus 1 of Example 1.
Figure 2:
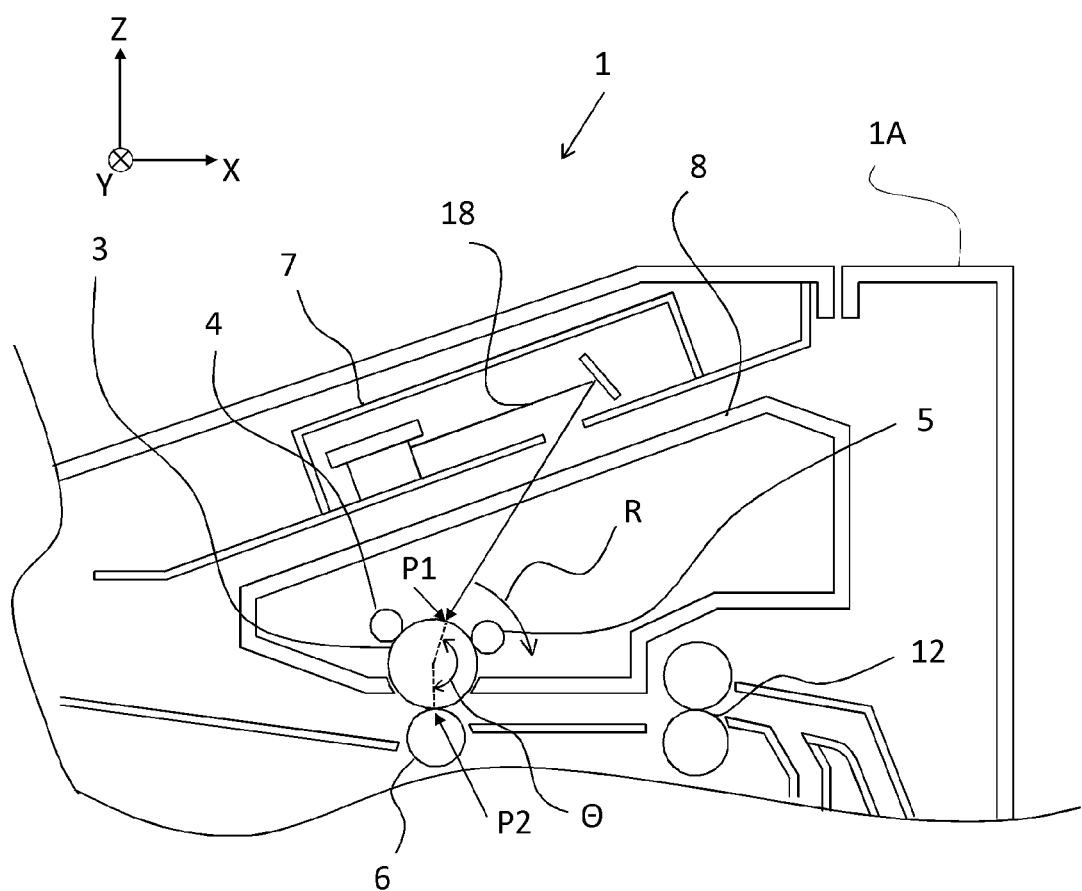
FIG. 2 is a schematic enlarged cross-sectional view of the image forming apparatus 1 of Example 1.

FIGS. 1 and 2 are a schematic cross-sectional view and a schematic enlarged cross-sectional view of an image forming apparatus 1 according to Example 1 of the present invention. The image forming apparatus 1 of Example 1 is a monochrome laser beam printer that can form a monochrome image using an electrophotographic system. In FIGS. 1 and 2, the front-back direction of the image forming apparatus 1 is the X direction, the width direction (width direction of the recording material S) is the Y direction, and the height direction (vertical direction when the image forming apparatus 1 is installed on a horizontal plane) is the Z direction. The right side of FIGS. 1 and 2 is the front surface of the image forming apparatus 1, and the left side thereof is the rear surface. The direction from the rear surface to the front surface of the image forming apparatus 1 is the +X direction, and the direction from the left to the right of the image forming apparatus 1 viewed from the front surface thereof (direction from this side to the other side of the paper) is the +Y direction, and the direction from the bottom to the top of the paper is the +Z direction. FIGS. 1 and 2 are diagrams of the image forming apparatus 1 viewed from the left side in the +Y direction.

The image forming apparatus 1 includes a drum type electrophotographic photosensitive member (hereafter photosensitive drum 3) as an image bearing member. The photosensitive drum 3 is constituted of a cylinder-shaped drum body made of aluminum, nickel, or the like, on which a layer of photosensitive material, such as an organic photoconductor (OPC), amorphous selenium, and amorphous silicon, is formed. The photosensitive drum 3 is rotary-driven by a driving source at a predetermined speed. Around the photosensitive drum 3, a charging roller 4 (charging member), a developing roller 5 (developing member) and a transfer roller 6 (transfer member) are disposed sequentially in the rotating direction. A scanner unit 7 (exposure apparatus) is disposed above the photosensitive drum 3. The image forming apparatus 1 includes an apparatus main unit 1A, and a process cartridge 8 that is detachable from the apparatus main unit 1A. The photosensitive drum 3, the charging roller 4 and the developing roller 5 are included inside the process cartridge 8.

The image forming apparatus 1 also includes, in order along the transporting path of a recording material S, a cassette paper feeding unit 9 which loads recording materials S which are recording media (e.g. paper), a paper feeding roller 10, a transporting roller 11, a resist roller 12, a fixing apparatus 13, a discharging roller 14 and a paper delivery tray 15.

An operation of the image forming apparatus 1 will be described. The photosensitive drum 3 is exposed by the scanner unit 7 at an exposure position P1. The photosensitive drum 3, which is rotary-driven by the driving source, is uniformly charged to have a predetermined polarity and a predetermined potential by the charging roller 4. The photosensitive drum 3 after charging is exposed by the scanner unit 7 at the exposure position P1 based on the image information, whereby an electrostatic latent image is formed on the photosensitive drum 3. The electrostatic latent image is developed by the developing roller 5, and is visualized as a developer image (toner image). The toner image on the photosensitive drum 3 is transferred to the recording material S (transfer target material) by the transfer roller 6 at a transfer position P2. The image forming apparatus 1 may transfer the toner image on the photosensitive drum 3 to the recording material S via an intermediate transfer material. In this case, the toner image on the photosensitive drum 3 is transferred to the intermediate transfer material (transfer target material) at the transfer position P2.

The recording material S is transported by the paper feeding roller 10 in the X direction from the cassette paper feeding unit 9 where the recording materials S are loaded and stored. The recording material S is transported to a transfer nip portion, which is formed by the transfer roller 6 and the photosensitive drum 3, by way of the transporting roller 11 and the resist roller 12. The toner image, which was transferred from the photosensitive drum 3 to the recording material S at the transfer nip portion, is heated and fixed by the fixing apparatus 13. The recording material S, which passed the fixing apparatus 13, is discharged onto the paper delivery tray 15 in the X direction via the discharging roller 14.

Figure 3:
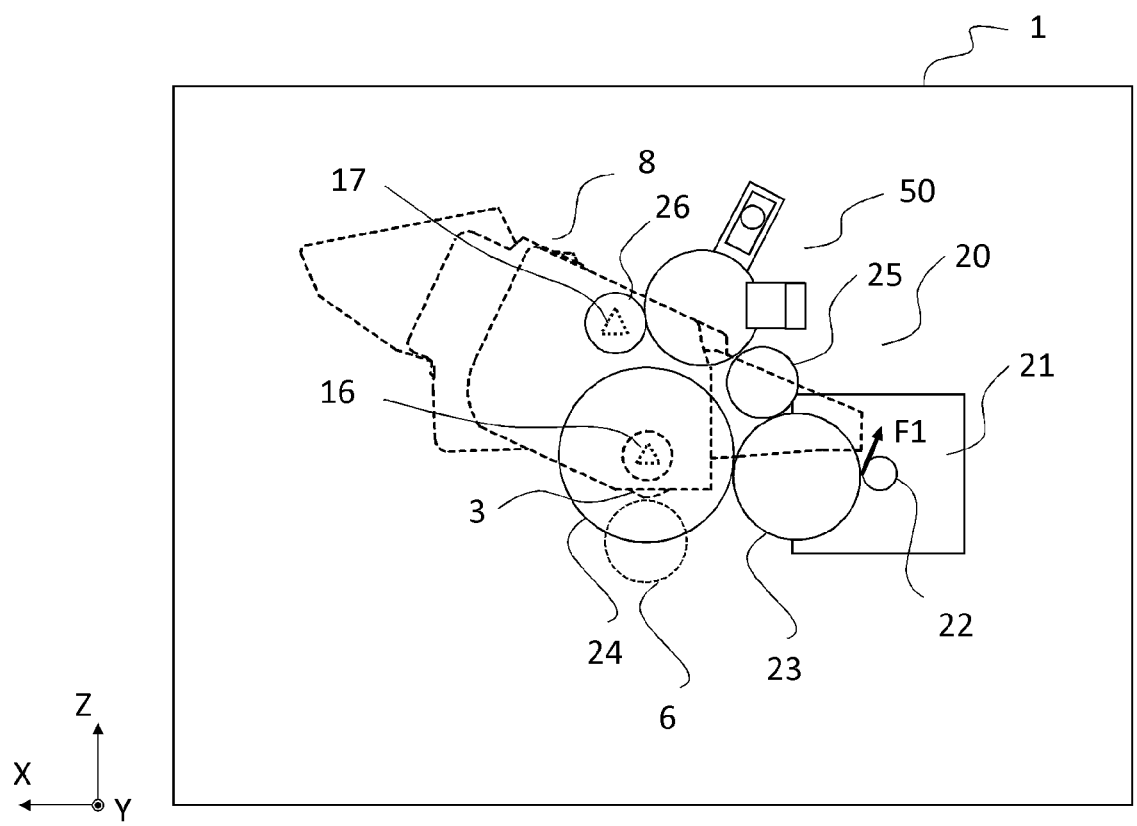
FIG. 3 is a side view of the image forming apparatus 1 of Example 1.

A driving unit of the process cartridge 8 will be described. FIG. 3 is a side view of the image forming apparatus 1, when the image forming apparatus 1 is viewed from the right side in the −Y direction. As illustrated in FIG. 3, the process cartridge 8 has a first driving input unit 16 and a second driving input unit 17.

The first driving input unit 16 of the process cartridge 8 receives power from a driving motor 21, which is a driving source (describe later), and drives the photosensitive drum 3 of the process cartridge 8. The photosensitive drum 3 is an example of a driven member, which is rotary-driven by power transmitted from the driving source.

The second driving input unit 17 of the process cartridge 8 is a driving input unit to drive the developing roller 5 of the process cartridge 8, and is disposed separately from the driving input unit of the photosensitive drum 3.

In the present embodiment, in the print operation (image forming operation), the photosensitive drum 3 is rotary-driven from the start to the end of transporting the recording material S. The developing roller 5, on the other hand, is rotary-driven only during the developing period by a later mentioned developing switching mechanism 50 receiving the switching operation force from a developing contact/separation mechanism (not illustrated). Thereby toner consumption can be suppressed and life of a developing roller constituting the developing roller 5 can be extended.

Each of the first driving input unit 16 and the second driving input unit 17 has a triangular coupling shape in order to transmit power. A different coupling shape may be used as long as the power can be transmitted, or power may be transmitted using a gear.

Now a gear train of the driving unit 20, to drive the process cartridge 8, will be described. The image forming apparatus 1 includes a pinion gear 22 (first gear) disposed on an output shaft of the driving motor 21 (driving source), a branching gear 23 (second gear) which engages with the pinion gear 22, and a first driving input gear 24 which engages with the branching gear 23. The branching gear 23 engages with a later mentioned gear teeth portion 22a of the pinion gear 22, and is driven by the pinion gear 22. In the present embodiment, the first driving input gear 24 is disposed coaxially with the rotational axis of the photosensitive drum 3 (driven member). This means that the image forming apparatus 1 has a gear train constituted of at least one gear, to transmit power from the pinion gear 22 to the first driving input gear 24.

In Example 1, a coupling shape, matching with the first driving input unit 16 of the process cartridge 8, is formed at the tip of the first driving input gear 24, so that the photosensitive drum 3 can be rotary-driven by the power transmission via the coupling shape. The branching gear 23 transmits the power of the driving motor 21 to an idler gear 25. This power is transmitted to a second driving input gear 26 via a developing switching mechanism (developing clutch) 50. A coupling shape, matching with the second driving input unit 17 of the process cartridge 8, is formed at the tip of the second driving input gear 26, so that the developing roller 5 can be rotary-driven by the power transmission via the coupling shape. In other words, the pinion gear 22 and the branching gear 23 are configured to drive the photosensitive drum 3 and the developing roller 5.

A number of gear teeth of the driving unit 20 will be described next. As illustrated in FIG. 2, the photosensitive drum 3 of the image forming apparatus 1 of Example 1 rotates in a rotation direction R, from an exposure position P1 where the laser light 18 enters from the scanner unit 7. Here a drum rotation angle Θ, from the exposure position P1 to a transfer position P2 where the toner image is transferred to the recording material S, is assumed to be 151°. Generally the drum rotation angle Θ is not exactly 180°, but is slightly shifted because of such reasons as preventing reflection of incident light, the position of the scanner unit 7, and process factors.

In order to transfer a high quality image without image distortion to a recording material S, it is preferable to suppress influence of rotation irregularity, when the photosensitive drum 3 rotates from the exposure position P1 to the transfer position P2, to transfer a toner image. The rotation irregularity in one cycle of the pinion gear 22 is influenced not only by gear accuracy, but also by axial runout of the driving motor 21, and rotation irregularity of the driving motor 21. In Example 1, influence of rotation irregularity caused by driving transmission is cancelled by performing driving transmission to the photosensitive drum 3 as follows.

In Example 1, the drum rotation angle Θ, when the photosensitive drum 3 rotates from the exposure position P1 to the transfer position P2, is set to 151°. Then a deceleration ratio is determined such that the branching gear 23 (a gear constituting the gear train engaged with the first driving input gear 24) and the pinion gear 22 (the first gear) rotate an integral number of times while the photosensitive drum 3 and the first driving input gear 24 rotate by angle Θ. In other words, when the drum rotation angle is Θ and a number of teeth of the first driving input gear 24 is Z1, a number of teeth Z2, for the branching gear 23 to rotate n times, is Z2=Z1 (Θ/360n).

In the case of Example 1, a number of teeth Z1 of the first driving input gear 24 is 129, hence a number of teeth Z2 of the branching gear 23 becomes Z2=129 (151/360)=54.11, and the branching gear 23 rotates once when the number of teeth is 54. In the same manner, a number of teeth Z3 of the pinion gear 22 becomes Z3=129 (151/(360×3))=18.04, and the pinion gear 22 rotates 3 times when the number of teeth is 18. As a result, even if rotation irregularity is generated in the branching gear 23 or in the pinion gear 22 due to gear accuracy problem or the like, the rotation irregularity becomes the same at the exposure position P1 and the transfer position P2. Therefore influence of the rotation irregularity is cancelled in the image transferred onto the recording material S, and a high quality image without image distortion can be acquired.

Figure 4A:
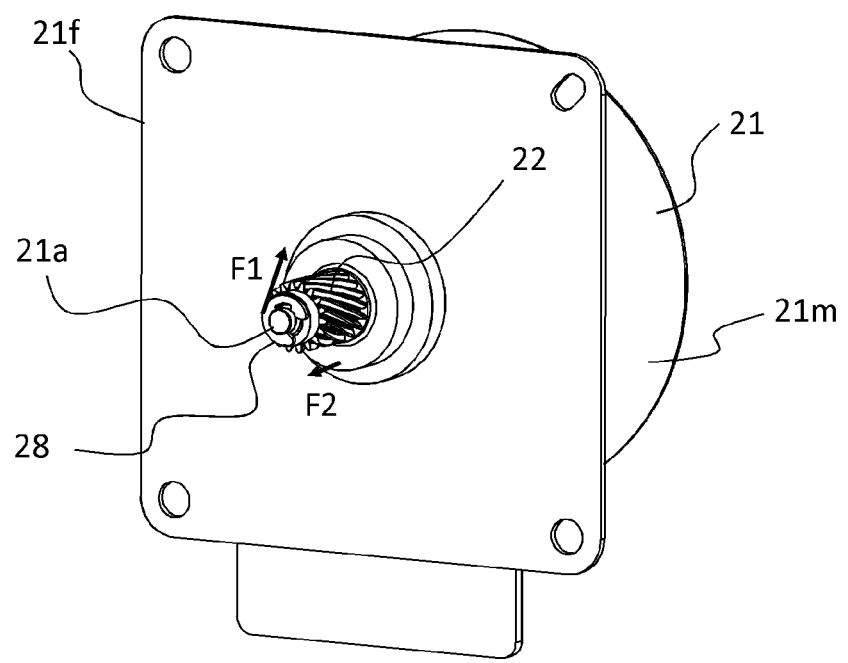
FIG. 4A is a perspective view of a driving motor 21 and a pinion gear 22 of Example 1.
Figure 4B:
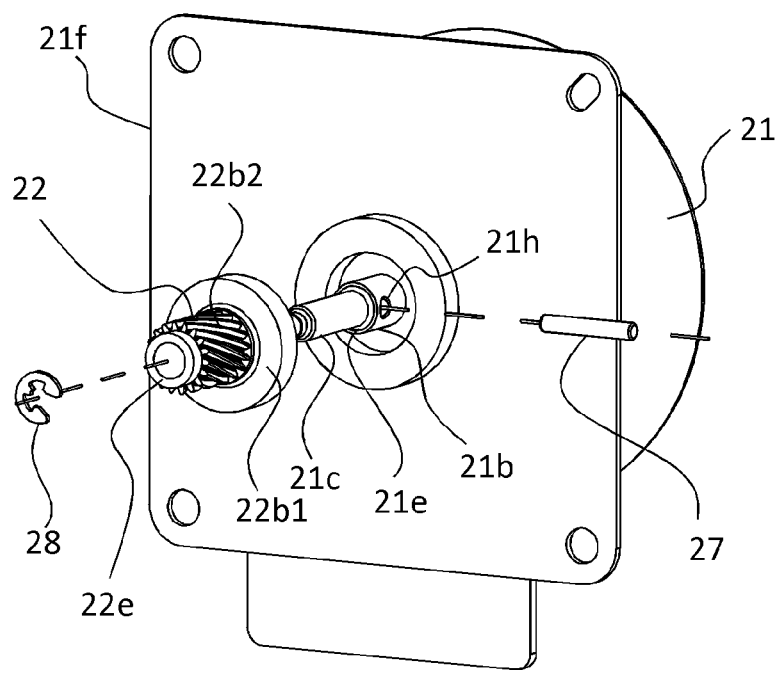
FIG. 4B is a perspective view of a driving motor 21 and a pinion gear 22 of Example 1.
Figure 5A:
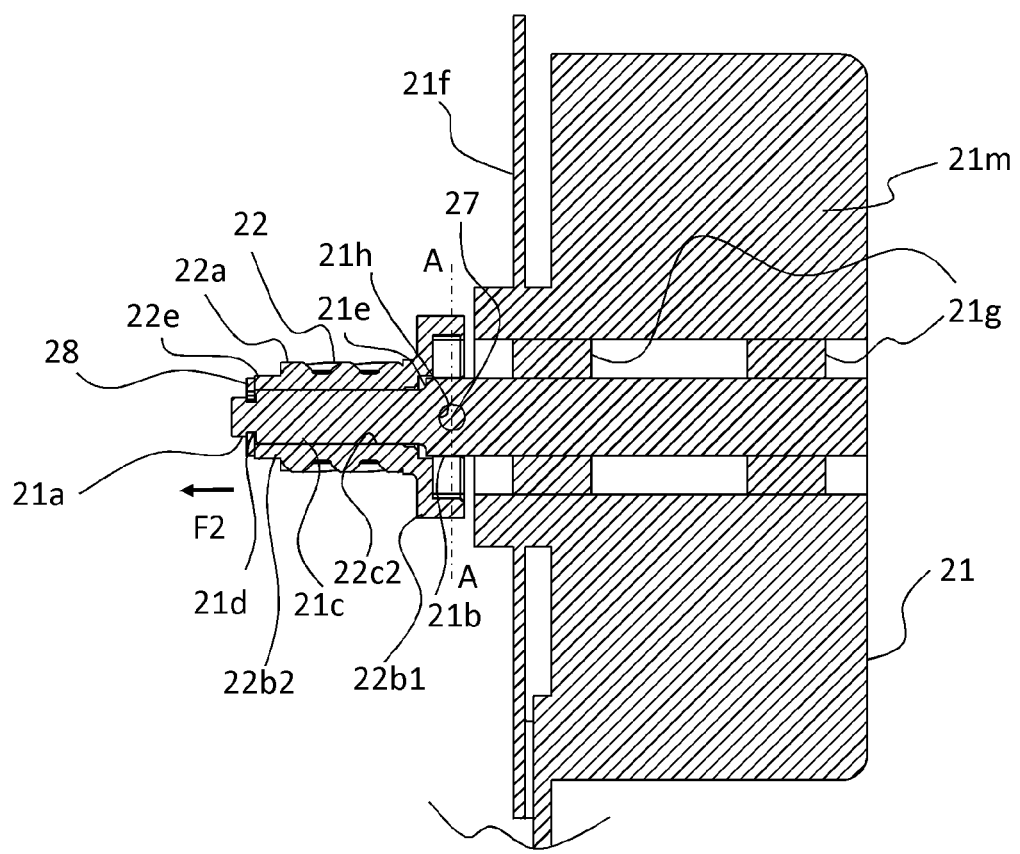
FIG. 5A is a cross-sectional view of the driving motor 21 and the pinion gear 22 of Example 1.
Figure 5B:
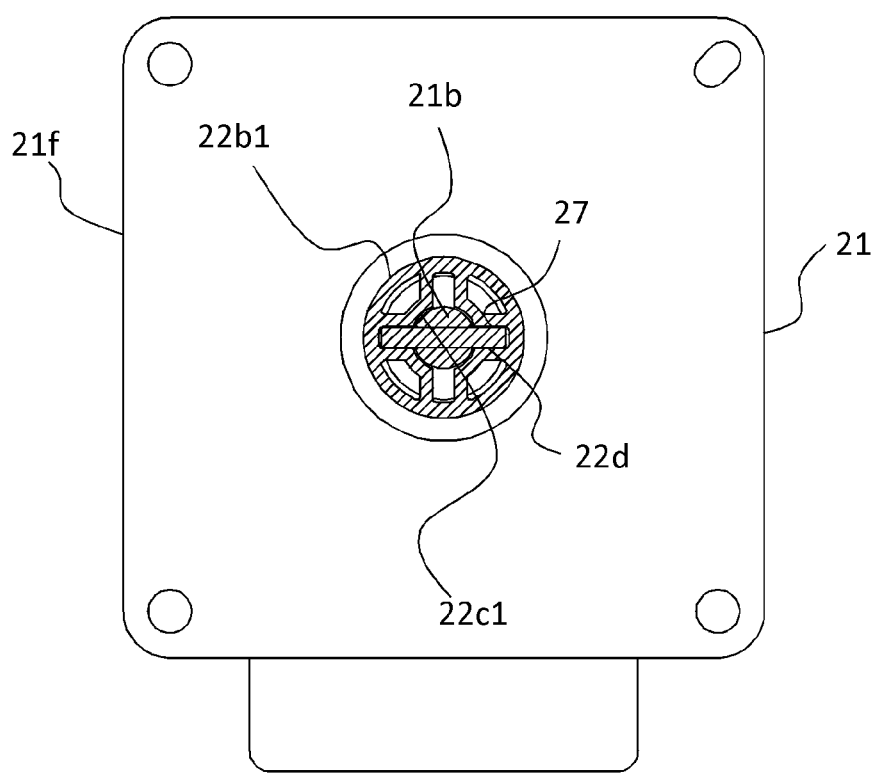
FIG. 5B is a cross-sectional view of the driving motor 21 and the pinion gear 22 of Example 1.

Now the driving motor 21 and the pinion gear 22 will be described in detail. FIGS. 4A and 4B are perspective views of the driving motor 21 and the pinion gear 22. FIG. 4A indicates a state where the pinion gear 22 is mounted on the motor shaft 21a, and FIG. 4B indicates a state where the pinion gear 22 is detached from the motor shaft 21a. FIG. 5A is a cross-sectional view of the driving motor 21 and the pinion gear 22 sectioned at a plane which is perpendicular to the central axis line of a later mentioned parallel pin hole 21h and includes the rotational axis of the motor shaft 21a. FIG. 5B is a cross-sectional view of the pinion gear 22 and a parallel pin 27 sectioned at a plane indicated by the AA line in FIG. 5A. The direction of the rotational axis of the motor shaft 21a is called the axis line direction.

The driving motor 21 includes the motor shaft 21a, which is an output shaft to output power transmitted to the photosensitive drum 3. The material of the motor shaft 21a is preferably metal. The pinion gear 22 (first gear) is disposed on the motor shaft 21a. The motor shaft 21a includes a first shaft diameter portion 21b, which is a large diameter portion having a first outer diameter, a second shaft diameter portion 21c, which is a small diameter portion having a second outer diameter that is smaller than the first outer diameter, and a third shaft diameter portion 21d, which has a third outer diameter that is smaller than the second outer diameter.

The first shaft diameter portion 21b (large diameter portion) includes the parallel pin hole 21h, which is a through hole penetrating the motor shaft 21a in the direction intersecting with (perpendicular to) the rotational axis of the motor shaft 21a. The parallel pin 27 is inserted into the parallel pin hole 21h so as to protrude from the parallel pin hole 21h. In Example 1, the parallel pin 27, which is longer than the length of the parallel pin hole 21h, is inserted into the parallel pin hole 21h, but the parallel pin 27, which is shorter than the parallel pin hole 21h, may be inserted so as to protrude from one edge of the parallel pin hole 21h. In this case, another parallel pin 27, which protrudes from the other edge of the parallel pin hole 21h, may be inserted. Instead of the parallel pin, a spring pin or a pin having a polygonal cross-section may be used.

The second shaft diameter portion 21c is disposed at a position corresponding to the gear teeth portion 22a of the pinion gear 22 in the axis line direction of the motor shaft 21a, and supports the pinion gear 22. An E-ring 28 is disposed in the third shaft diameter portion 21d, so that the pinion gear 22 does not come off in the motor shaft 21a direction. The radius of the corner portion at the boundary of the first shaft diameter portion 21b and the second shaft diameter portion 21c increases along the axis line in the direction from the second shaft diameter portion 21c to the first shaft diameter portion 21b. Specifically, in the corner portion at the boundary of the first shaft diameter portion 21b and the second shaft diameter portion 21c, a corner R shape 21e, of which diameter increases in the direction from the second shaft diameter portion 21c to the first shaft diameter portion 21b, is disposed. The corner R shape 21e can prevent the stress concentration of radial load F1 due to the later mentioned driving transmission, and enhance the strength of the motor shaft 21a.

The motor shaft 21a is held via a bearing 21g, which is a bearing to rotatably support the motor shaft 21a, and can rotate with respect to a mounting metal plate 21f, to mount the driving motor 21 on the apparatus main unit 1A of the image forming apparatus 1. In Example 1, the outer diameter of the portion of the motor shaft 21a supported by the bearing 21g is the same as the outer diameter (first outer diameter) of the first shaft diameter portion 21b which is the large diameter portion.

The pinion gear 22 has a first portion (large inner diameter portion) 22b1 which includes a first opening 22c1 having a first diameter, a second portion (small inner diameter portion) 22b2 which includes a second opening 22c2 having a second diameter which is smaller than the first diameter, and a contact surface 22e which is in contact with the E-ring 28. In other words, the first portion 22b1 of the pinion gear 22 may be called a first cylindrical portion having a cylindrical shape of which inner diameter is the first diameter, and the second portion 22b2 may be called a second cylindrical portion having a cylindrical shape of which inner diameter is the second diameter. The first portion 22b1 and the second portion 22b2 are disposed in positions shafted from each other in the axis line direction of the motor shaft 21a, and the first portion 22b1 is closer to the motor main unit 21m of the driving motor 21 than the second portion 22b2. The motor main unit 21m houses a rotor, a stator and the bearing 21g. The length of the first portion 22b1 is shorter than the length of the second portion 22b2 in the axis line direction of the motor shaft 21a.

The pinion gear 22 is mounted on the motor shaft 21a such that the first shaft diameter portion 21b is inserted into the first opening 22c1 and the second shaft diameter portion 21c is inserted into the second opening 22c2. In Example 1, the first diameter of the first opening 22c1 is larger than the first outer diameter of the first shaft diameter portion 21b, and a gap exists between the inner peripheral surface of the first portion 22b1 constituting the first opening 22c1 and the first shaft diameter portion 21b. Specifically, the diameter of the first opening 22c1 is 6.4 mm, and the outer diameter of the first shaft diameter portion 21b is 6 mm.

The first portion 22b1 is located at a position corresponding to the first shaft diameter portion 21b of the motor shaft 21a in the axis line direction, and includes, on the inner periphery side: the first opening 22c1; and a parallel pin receiving portion 22d, which is an engaging portion to be engaged with the parallel pin 27 protruding from the parallel pin hole 21h. In Example 1, the parallel pin receiving portion 22d is a depressed portion. By the parallel pin 27 fitting with the parallel pin hole 21h, rotation of the pinion gear 22 around the rotational axis of the motor shaft 21a is restricted. When the parallel pin receiving portion 22d contacts with the parallel pin 27, the rotational driving force is transmitted from the parallel pin 27 to the gear teeth portion 22a, which is disposed on the outer peripheral surface of the second portion 22b2.

In other words, the image forming apparatus 1 includes a rotation restricting portion which is disposed at a position corresponding to the first shaft diameter portion 21b in the axis line direction, and restricts rotation of the pinion gear 22 with respect to the motor shaft 21a. Thereby power is transmitted from the motor shaft 21a to the pinion gear 22. At least a part of the first shaft diameter portion 21b functions as the rotation restricting portion. In Example 1, the rotation restricting portion includes the parallel pin hole 21h and the parallel pin 27. By disposing the rotation restricting portion at a position corresponding to the first shaft diameter portion 21b in the axis line direction, the force for driving the branching gear 23 and the reaction force received from the branching gear 23 act on the first shaft diameter portion 21b, which is thicker than the second shaft diameter portion 21c. Therefore compared with the case of disposing the rotation restricting portion at a position corresponding to the second shaft diameter portion 21c, a larger force can be transmitted to the pinion gear 22. Further, by forming the parallel pin hole 21h in the first shaft diameter portion 21b, the strength of the motor shaft 21a can be better maintained compared to the case of forming the parallel pin hole 21h in the second shaft diameter portion 21c.

The gear teeth portion 22a, which engages with the branching gear 23, is disposed on the outer peripheral surface of the second portion 22b2, and the inner peripheral surface thereof is supported by the second shaft diameter portion 21c of the motor shaft 21a. Specifically, the inner peripheral surface of the second portion 22b2 constituting the second opening 22c2 is in contact with the second shaft diameter portion 21c. In Example 1, the second shaft diameter portion 21c is press-fitted in the second opening 22c2.

The contact surface 22e is an end surface that is vertical to the axis line direction of the motor shaft 21a, and is disposed on the edge of the second portion 22b2.

The parallel pin 27 receives rotating force from the parallel pin hole 21h disposed in the first shaft diameter portion 21b of the driving motor 21, and transmits the power to the parallel pin receiving portion 22d of the pinion gear 22. When the pinion gear 22, mounted on the driving motor 21, transmits power to the branching gear 23, the motor shaft 21a receives radial load F1, in accordance with the pressure angle of the gear teeth portion 22a, from the pinion gear 22. The pinion gear 22 is a helical gear, hence the thrust load F2, which is generated based on the helical gear torsion angle and rotation direction, is received by the side surface of the third shaft diameter portion 21d of the motor shaft 21a from the contact surface 22e of the pinion gear 22 via the E-ring 28.

Figure 6A:
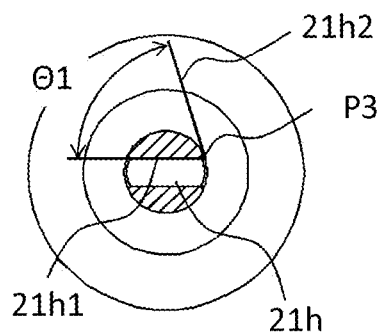
FIGS. 6A to 6F are diagrams depicting the motor shaft 21a of Example 1 and motor shafts 321a and 421a of comparative examples.
Figure 6D:
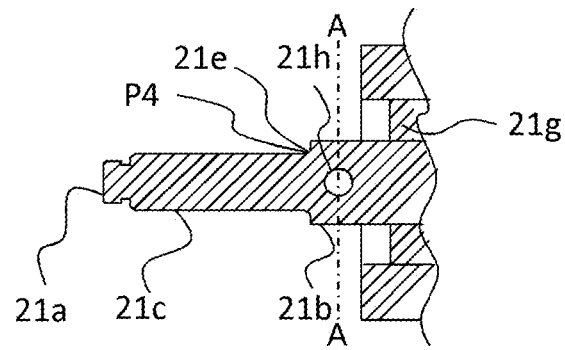
Figure 6B:
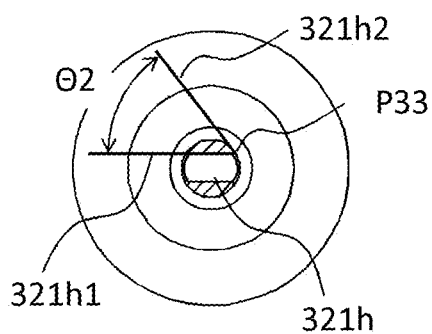
Figure 6E:
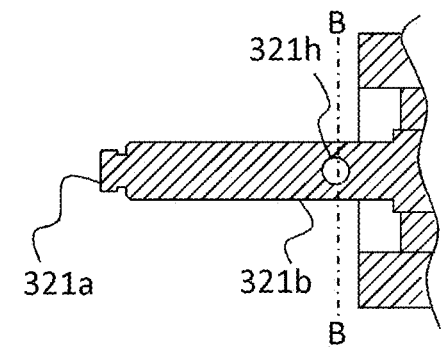
Figure 6C:
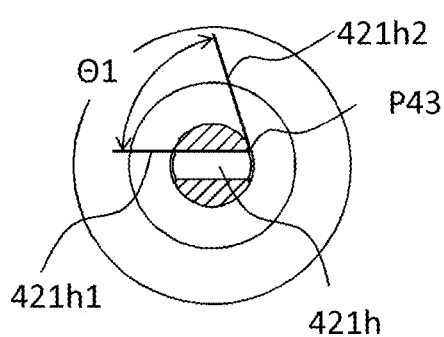
Figure 6F:
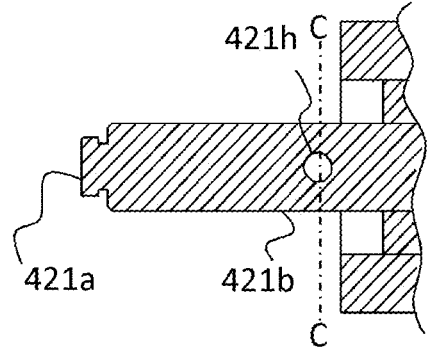
Figure 7A:
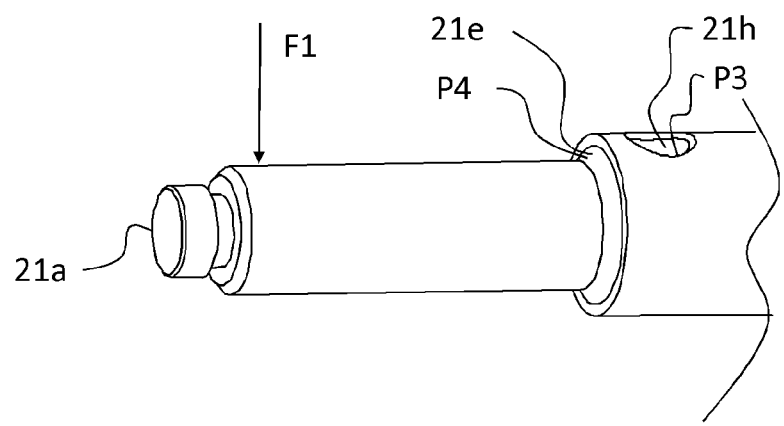
FIG. 7A is a diagram depicting the motor shaft 21a of Example 1.

Now the motor shaft 21a will be described in detail. FIGS. 6A to 6C are cross-sectional views of the driving motor 21, sectioned at a plane which is vertical to the rotational axis of the motor shaft 21a, and which passes through the center of the parallel pin hole 21h, 321h or 421h. FIGS. 6D to 6E are cross-sectional views of the driving motor 21 sectioned at a plane which includes the rotational axis of the motor shaft 21a. FIG. 6A is a cross-sectional view sectioned at the A-A line in FIG. 6D, FIG. 6B is a cross-sectional view sectioned at the B-B line in FIG. 6E, and FIG. 6C is a cross-sectional view sectioned at the C-C line in FIG. 6F. FIGS. 6A and 6D indicate a configuration of Example 1, and FIGS. 6B, 6C, 6E and 6F indicate configurations of the motor shafts 321a or 421a of comparative examples. FIG. 7A is a perspective view of the motor shaft 21a of Example 1. FIG. 7B indicates each stress generated in the parallel pin holes 21h, 321h, 421h and the corner R shape 21e when the motor shaft 21a receives the radial load F1, and the indicated values are values assuming the stress generated in the parallel pin hole 421h in FIG. 6C is 1.

Specific dimensions will be described with reference to FIG. 6A. FIG. 6A indicates a portion of the motor shaft 21a of Example 1, where the first shaft diameter portion 21b is less than Φ 7 mm, and the second shaft diameter portion 21c is less than Φ 5 mm. Specifically, the first shaft diameter portion 21b is Φ 6 mm, the second shaft diameter portion 21c is Φ 4.2 mm, and the corner R shape 21e is R 0.5 mm. In FIG. 6B, the first shaft diameter portion 321b is Φ 4.2 mm, where the parallel pin hole 321h is disposed in the first shaft diameter portion 321b, and the pinion gear 22 is supported in the first shaft diameter portion 321b. In FIG. 6C, the first shaft diameter portion 421b is Φ 6 mm, where the parallel pin hole 421h is disposed in the first shaft diameter portion 421b, and the pinion gear 22 is supported in the first shaft diameter portion 421b. The parallel pin hole of the parallel pin hole 21h, 321h or 421h is less than 3 mm, and is specifically Φ 2 mm. A value determined by dividing the diameter of the parallel pin hole 21h, 321h or 421h by the outer diameter of the second shaft diameter portion 21c is more than 0.4, and a value determined by dividing the diameter of the parallel pin hole 21h, 321h or 421h by the outer diameter of the first shaft diameter portion 21b is less than 0.4.

The inner diameter of the bearing 21g of the driving motor 21 is Φ 6 mm, and the outer diameter of the portion of the motor shaft 21a, 321a or 421a supported by the bearing 21g is Φ 6 mm. Since the outer diameter of the first shaft diameter portion 21b or 421b is Φ 6 mm, which is the same as the portion supported by the bearing 21g, the processing amount (time and cost) to acquire the motor shaft 21a or 421a can be reduced.

In FIG. 6A, it is assumed that 21h1 is a line formed when a plane, which is vertical to the rotational axis of the motor shaft 21a and passes through the center of the parallel pin hole 21h, intersects with the inner peripheral surface of the parallel pin hole 21h. P3 is an intersection between the line 21h1 and the outer peripheral surface of the first shaft diameter portion 21b. 21h2 is a line that contacts the outer peripheral surface of the first shaft diameter portion 21b at the intersection P3. Θ1 is an angle formed by the line 21h1 and the line 21h2. In FIG. 6B as well, lines 321h1 and 321h2, an intersection P33 and an angle Θ2 are defined in the same manner with respect to the parallel pin hole 321h and the first shaft diameter portion 321b. In FIG. 6C as well, lines 421h1 and 421h2, an intersection P43 and an angle Θ1 are defined in the same manner with respect to the parallel pin hole 421h and the first shaft diameter portion 421b. In FIGS. 6A and 6C, the dimensional relationship between the first shaft diameter portion and the parallel pin hole is the same, hence the same angle Θ1 is formed. Angles Θ1 and Θ2 become more acute as the diameters of the first shaft diameter portions 21b, 321b and 421b become smaller.

FIGS. 7A and 7B indicate the analysis results of the shapes in FIGS. 6A to 6C. FIG. 7A is an enlarged view of the motor shaft 21a in FIGS. 4A and 4B. When a radial load F1 is received, stress is generated in the parallel pin hole edge P3 of the parallel pin hole 21h and the corner R shape portion P4 of the corner R shape 21e. FIG. 7B indicates the results. In FIG. 7B, the stress in each portion is indicated by a value assuming the stress generated in the parallel pin hole edge P43 of the parallel pin hole 421h in FIG. 6C is 1.

In FIG. 6B, the angle Θ2 is a sharper acute angle than Θ1, and the stress generated in the parallel pin hole edge P33 becomes 4.29 times compared with FIG. 6C. This means that the motor shaft 321a in FIG. 6B can support the pinion gear 22 with a smaller shaft diameter compared with FIG. 6C, but receives more stress, which drops strength. In order to perform driving with the same stress as FIG. 6C in the configuration in FIG. 6B, the radial load F1 needs to be 1/4.29, and it is difficult to transmit power when load is high.

In FIG. 6C, the first shaft diameter portion 421b is Φ 6 mm, hence stress generated in the parallel pin hole edge P43 is small. However in the case of the configuration in FIG. 6C, the second portion 22b2, where the gear teeth portion 22a of the pinion gear 22 is disposed, is supported in the first shaft diameter portion 421b, hence the portion supported by the second portion 22b2 becomes thicker compared with FIGS. 6A and 6B. In this case, an increase in the outer diameter of the outer peripheral surface, where the gear teeth portion 22a is disposed, can be suppressed by decreasing the thickness of the second portion 22b2 of the pinion gear 22. The material of the pinion gear 22 is resin, and is polyacetal resin (POM) in the present embodiment. In Example 1, the pinion gear 22 is formed by injection molding. The thickness of the gear teeth portion 22a of the pinion gear 22 and the thickness of the second portion 22b2 corresponding to the gear teeth portion 22a are preferably 1 to 1.5 mm, considering the fluidity of the resin, sink marks after molding, component strength, and the like. Therefore if the difference between Φ 6 mm and Φ 4.2 mm (0.9 mm in the case of the radius) is compensated by decreasing the thickness of the second portion 22b2 of the pinion gear 22, the thickness becomes too thin. If the thickness of the second portion 22b2 is increased in accordance with the shaft diameter of the portion supporting the pinion gear 22, a pitch circle diameter of the gear teeth portion 22a also increases, hence the peripheral speed of the gear teeth portion 22a of the pinion gear 22 increases, and operating sound also increases. Further, in order to cancel the above mentioned image distortion of the driving system up to the pinion gear 22 and the branching gear 23, a number of gear teeth Z1 of the first driving input gear 24 and a number of gear teeth Z2 of the branching gear 23 need to be increased respectively, which results in an increase in the size of the image forming apparatus 1.

In the case of using a small pinion gear 22, the length, when the outer diameter of the first shaft diameter portion 21b is subtracted from the root circle diameter of the gear teeth portion 22a of the pinion gear 22, is less than 2 mm. Specifically, the root circle diameter of the gear teeth portion 22a is 6.6 mm, and the difference from the outer diameter 6 mm of the first shaft diameter portion 21b is 0.6 mm. In this case, if the second portion 22b2 is supported by the shaft having the same thickness as the first shaft diameter portion 21b, the thickness of the second portion 22b2 up to the root circle of the gear teeth portion 22a is 0.3 mm. In other words, it is difficult to support the second portion 22b2 while maintaining the thickness of the second portion 22b2.

The difference between the root circle diameter of the gear teeth portion 22a of the pinion gear 22 and the diameter of the second opening 22c2 is preferably at least 2 mm and not more than 3 mm, considering at least one of the fluidity of the resin, sink marks after molding, component strength, or the like. The thickness of the second portion 22b2 up to the root circle of the gear teeth portion 22a can be ensured to be 1 mm to 1.5 mm. In Example 1, the root circle diameter of the gear teeth portion 22a of the pinion gear 22 is 6.6 mm, and the diameter of the second opening 22c2 is 4.2 mm.

In Example 1 in FIG. 6A, the stress factor of the parallel pin hole edge P3 is about the same as FIG. 6C (1.1 times). By disposing the corner R shape 21e at the corner between the first shaft diameter portion 21b and the second shaft diameter portion 21c, the stress factor of the corner R shape portion P4 becomes about the same as FIG. 6C (1.04 times). As a result, the shaft diameter of the second shaft diameter portion 21c can be thin, like FIG. 6B, the peripheral speed of the pinion gear 22 can be decreased, and an increase in operation sound can be suppressed. Further, power can be transmitted with a high load similar to FIG. 6C. Furthermore, the above mentioned image distortion of the driving system up to the pinion gear 22 and the branching gear 23 can be cancelled, hence there is no need to increase the number of gear teeth Z1 of the first driving input gear 24 and the number of gear teeth Z2 of the branching gear 23, and the size of the image forming apparatus 1 does not increase very much.

As described above, in Example 1, the first shaft diameter portion 21b and the second shaft diameter portion 21c are disposed on the motor shaft 21a, whereby the peripheral speed of the pinion gear 22 can be decreased, and power can be transmitted with high load while keeping the operation sound low.

Further, in the case where the drum rotation angle of the photosensitive drum 3, from the exposure position P1 to the transfer position P2, is Θ, the gear trains of the branching gear 23 and the pinion gear 22 can be configured so as to rotate for an integral number of times while the photosensitive drum 3 rotates for this angle, without increasing the size of the gears. Therefore the image distortion on the recording material S is cancelled, and a high quality image can be acquired while suppressing the increase in the size of the apparatus.

As a result, the strength of the motor shaft can be increased and power can be transmitted with high load without increasing the size of the apparatus, and the image forming apparatus 1 that can acquire a high quality image while suppressing the operation sound is implemented.

Whereas the present invention has been described with reference to a concrete embodiment, the present invention is not limited to the above embodiment. The branching gear 23 is one gear in the above description, but a step gear may be used such that an output side gear, which transmits driving to the first driving input gear 24, has a number of teeth with which the above mentioned branching gear 23 rotates for an integral number of times, and an input side gear, to which driving is transmitted from the pinion gear 22, rotates for a same integral number of times as the pinion gear 22. Thereby a similar effect can be acquired.

The driving unit 20 drives the process cartridge 8 in the above description, but even in the case where another driven member, such as a roller to transport the recording material S, is driven as well, the effect of enhancing the strength of the motor shaft 21a while suppressing an increase in operation sound can be acquired.

The pinion gear 22 is retained by the E-ring 28 in the above description, but the pinion gear 22 may be secured by press fitting, adhesion, or the like, as long as the pinion gear 22 can be retained. Further, if the thrust load F2 is generated toward the parallel pin 27 by changing the torsion angle or the rotation direction of the helical gear, the E-ring 28 is not required.

Dimensions of the first shaft diameter portion 21b, the second shaft diameter portion 21c, the parallel pin hole 21h and the corner R shape 21e are indicated above using concrete numeric values, but these are examples for explanatory purposes. A threshold of the stress may be determined considering actual operation conditions (e.g. load condition, shaft material, life of product), and dimensions may be appropriately determined such that the stress generated in each portion does not exceed the threshold.

The corner R shape 21e is disposed at the corner between the first shaft diameter portion 21b and the second shaft diameter portion 21c in the above description, but the corner C chamfering shape may be formed in according with the stress.

The pinion gear 22 is the helical gear in the above description, but a driving unit 20 may be a pulley that drives a toothed belt, as long as the driving transmission can be performed.

Example 2

Figure 8A:
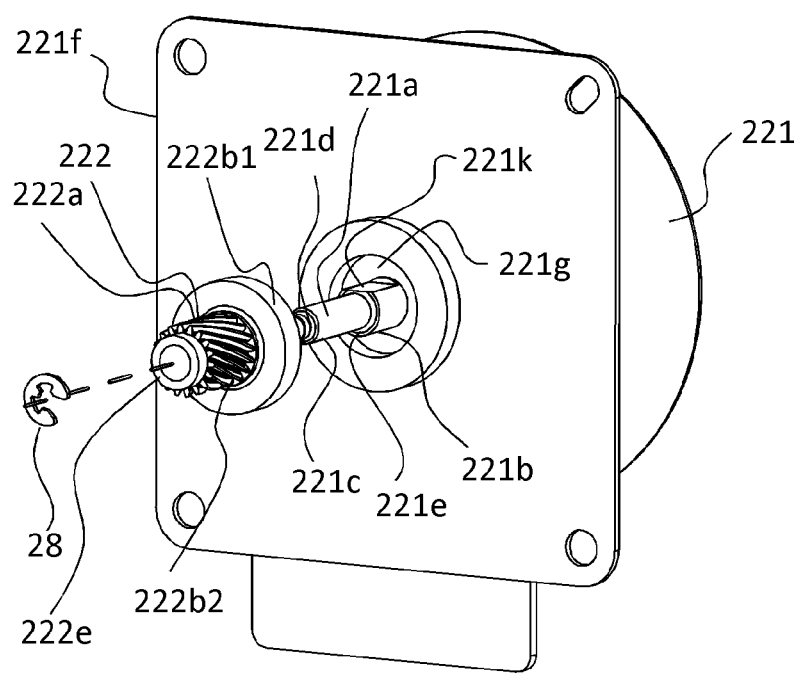
FIG. 8A is a perspective view of a driving motor 21 and a pinion gear 22 of Example 2.
Figure 8B:
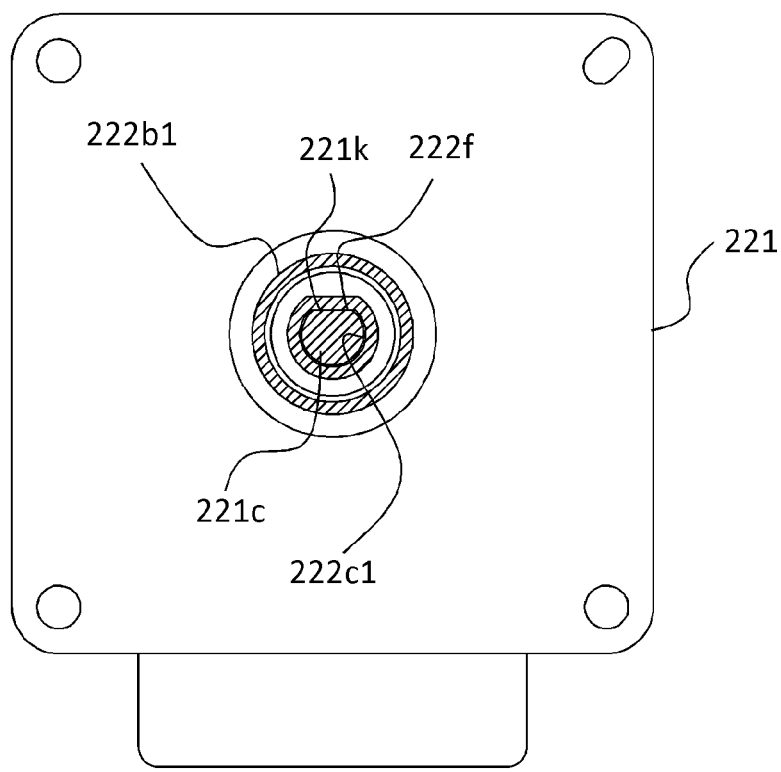
FIG. 8B is a cross-sectional view a driving motor 21 and a pinion gear 22 of Example 2.

Example 2 of the present invention will be described next with reference to FIGS. 8A and 8B and FIGS. 9A to 9F. A composing element the same as Example 1 will be denoted with a same reference sign, and detailed description thereof will be omitted. FIGS. 8A and 8B are diagrams depicting a driving motor 221 and a pinion gear 222 of Example 2, and correspond to FIGS. 4B and 5B of Example 1 respectively. A main difference of Example 2 from Example 1 is the configuration of the pinion gear 222 and the motor shaft 221a.

The motor shaft 221a, which is an output shaft of the driving source, includes: a first shaft diameter portion 221b which is a large diameter portion having a first outer diameter; a second shaft diameter portion 221c which is a small diameter portion having a second outer diameter that is smaller than the first outer diameter; and a third shaft diameter portion 221d having a third outer diameter that is smaller than the second outer diameter.

The second shaft diameter portion 221c supports the pinion gear 222 at a second portion 222b2, where a gear teeth portion 222a of the pinion gear 222 is disposed.

In the third shaft diameter portion 221d, an E-ring 28 is disposed so that the pinion gear 222 does not come off in the motor shaft 221a direction.

The radius of the corner at the boundary of the first shaft diameter portion 221b and the second shaft diameter portion 221c increases along the axis line in the direction from the second shaft diameter portion 221c to the first shaft diameter portion 221b. Specifically, a corner R shape 221e has a shape of which the diameter increases in the direction from the second shaft diameter portion 221c to the first shaft diameter portion 221b. Thereby concentration of the stress of the radial load F1, caused by the later motioned driving transmission, can be prevented.

The motor shaft 221a is held via a bearing 221g, which is a bearing to rotatably support the motor shaft 221a, and can rotate with respect to a mounting metal plate 221f, to mount the driving motor 21 on the apparatus main unit 1A of the image forming apparatus 1. An outer diameter of a portion of the motor shaft 221a supported by the bearing 221g is the same as the outer diameter (first outer diameter) of the first shaft diameter portion 221b.

In Example 2 as well, the image forming apparatus 1 is disposed at a position corresponding to the first shaft diameter portion 221b in the axis line direction, and includes a rotation restricting portion which restricts the rotation of the pinion gear 222 with respect to the motor shaft 221a. Thereby power is transmitted from the motor shaft 221a to the pinion gear 222. Here at least a part of the first shaft diameter portion 221b functions as the rotation regulating portion. Specifically, the first shaft diameter portion 221b of Example 2 includes, on the outer peripheral surface, a D-shaped portion 221k, which is an outer peripheral flat portion which is parallel with the rotational axis of the motor shaft 221a, and of which distance from the rotational axis is shorter than a half the length of the first outer diameter (radius of the first shaft diameter portion 221b). A cross-section of the area where the D-shaped portion 221k is disposed, sectioned vertically to the rotational axis of the motor shaft 221a (first shaft diameter portion 221b) is D-shaped. The D-shaped portion 221k has a three-dimensional shape partially cutting the first shaft diameter portion 221b, but it is not always necessary to manufacture it by cutting.

The pinion gear 222 includes: a first portion 222b1 including a first opening 222c1 having a first diameter; a second portion 222b2 including a second opening (not illustrated) having a second diameter which is smaller than the first diameter; and a contact surface 222e which contacts with the E-ring 28. A gear teeth portion 222a, which engages with the branching gear 23, is disposed on the outer peripheral surface of the second portion 222b2. The second portion 222b2 is supported by the second shaft diameter portion 221c of the motor shaft 221a. The second portion 222b2, the second shaft diameter portion 221c, the contact surface 222e, and the gear teeth portion 222a have the same shapes as the second portion 22b2, the second shaft diameter portion 21c, the contact surface 22e, and the gear teeth portion 22a of Example 1 respectively. The diameter of the first opening 222c1 is 6.4 mm.

The first portion 222b1 is located at a position corresponding to the first shaft diameter portion 221b of the motor shaft 221a in the axis line direction. The inner peripheral surface thereof includes a D-shaped hole 222f, which is an inner peripheral flat portion parallel with the rotational axis of the pinion gear 222, and of which distance from the rotational axis is shorter than the half the length of the first diameter. The rotation of the pinion gear 222 with respect to the motor shaft 221a is restricted by contact between the D-shaped portion 221k (outer peripheral flat portion) and the D-shaped hole 222f (inner peripheral flat portion). The D-shaped hole 222f of the pinion gear 222 contacts with the D-shaped portion 221k of the motor shaft 221a, and the rotational force is transmitted from the D-shaped portion 221k to the gear teeth portion 222a, which is disposed on the outer peripheral surface of the second portion 222b2.

Figure 9C:
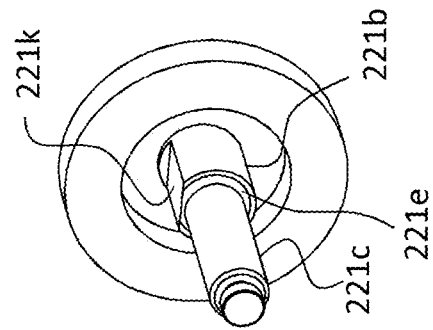
FIGS. 9A to 9F are diagrams depicting a motor shaft 221a of Example 2 and a motor shaft 521a of a comparative example.
Figure 9A:
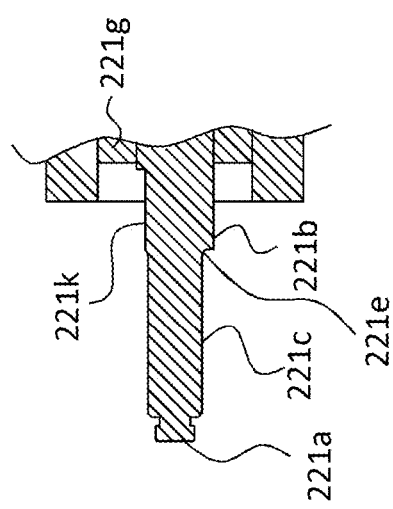
Figure 9E:
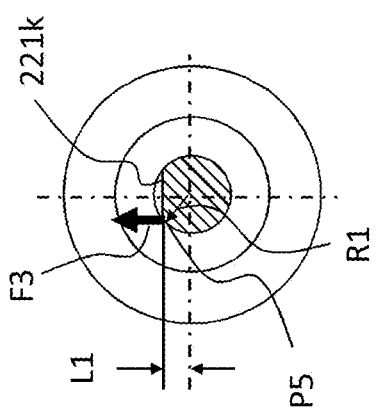
Figure 9D:
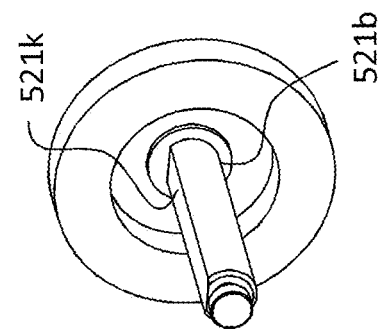
Figure 9B:
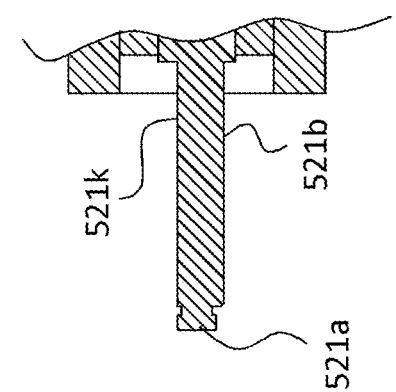
Figure 9F:
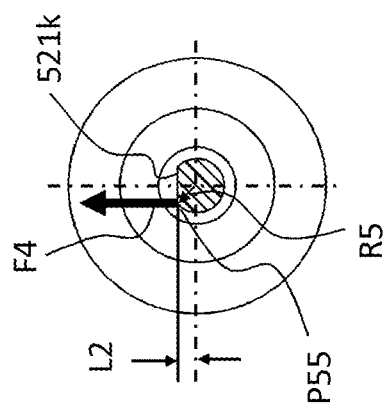

Now the motor shaft 221a will be described in detail. FIG. 9A is a cross-sectional view of the motor shaft 221a of Example 2, sectioned at a plane vertical to the rotational axis. FIG. 9B is a cross-sectional view of a motor shaft 521a of a comparative example, sectioned at a plane vertical to the rotational axis, corresponding to FIG. 9A. FIG. 9C is a cross-sectional view of the motor shaft 221a of Example 2, sectioned at a plane that includes the rotational axis. FIG. 9D is a cross-sectional view of the motor shaft 521a of a comparative example, sectioned at a plane that includes the rotational axis. FIG. 9E is a perspective view of the motor shaft 221a of Example 2. FIG. 9F is a perspective view of the motor shaft 521a of the comparative example.

Specific dimensions will be described with reference to FIG. 9A. In the motor shaft 221a of Example 2, the first shaft diameter portion 221b is Φ 6 mm, the second shaft diameter portion 221c is Φ 4.2 mm, and the corner R shape 221e is R 0.5 mm. A distance L1, from the rotational axis to the outer peripheral flat portion of the D-shaped portion 221k, is 2.3 mm, which is smaller than the radius R1 of the first shaft diameter portion 221b and is larger than the radius of the second shaft diameter portion 221c. In the comparative example in FIG. 9B, the first shaft diameter portion 521b is Φ 4.2 mm, and the pinion gear 222 is supported by the first shaft diameter portion 521b. A distance L2, from the rotational axis lien of the first shaft diameter portion 521b to the outer peripheral flat portion of the D-shaped portion 521k, is 1.5 mm, which is smaller than the radius R5 of the first shaft diameter portion 521b. The inner diameter of the bearing 221g of the driving motor 221 is Φ 6 mm, and the outer diameter of the portion of the motor shaft 221a supported by the bearing 221g is Φ 6 mm. Since the outer diameter of the first shaft diameter portion 221b is the same as the outer diameter Φ 6 mm of the portion supported by the bearing 221g, the process amount (time and cost) to acquire the motor shaft 221a can be reduced.

The driving transmission of the motor shaft 221a or 521a is performed in a portion near the intersection P5 or P55 (edge of the D-shaped portion 221k or 521k), between the outer peripheral flat portion of the D-shaped portion 221k or 521k of the first shaft diameter portion 221b or 521b and the outer peripheral surface of the first shaft diameter portion 221b or 521b. The load F3 or F4 that is applied to a portion near the intersection P5 or P55 (edge of the D-shaped portion 221k or 521k) is applied in a direction vertical to the outer peripheral flat portion of the D-shaped portion 221k or 521k. If the torque of the transmitted power is the same, the load is in inverse proportion to the radius of the portion to which this load is applied. Since the radius of the portion to which the load is applied is R1 (3 mm) or R5 (2.1 mm), the load is F3=2.1/3×F4. In other words, in order to apply a load the same as FIG. 9A to the outer peripheral flat portion of the first shaft portion and the inner peripheral flat portion of the pinion gear 222 in the configuration of FIG. 9B, the torque must be 2.1/3, and power cannot be transmitted while load is high.

Here it is assumed that the first shaft diameter portion 521b in FIG. 9B is changed from Φ 4.2 mm to Φ 6 mm, and the distance L2, from the rotational axis to the outer peripheral flat portion of the D-shaped portion 521k, is changed from 1.5 mm to 2.3 mm. If such modifications are performed, the load applied to the outer peripheral flat portion of the D-shaped portion of the first shaft diameter portion and the inner peripheral flat portion of the D-shaped hole of the pinion gear becomes F3, which is the same as FIG. 9A. However in this case, the pitch circle diameter of the gear teeth portion 222a of the pinion gear 222 becomes large, hence the peripheral speed of the gear teeth portion 222a of the pinion gear 222 increases, and the operation sound increases. Further, in order to cancel the above mentioned image distortion of the driving system up to the pinion gear 222 and the branching gear 23, a number of gear teeth Z1 of the first driving input gear 24 and a number of gear teeth Z2 of the branching gear 23 must be increased respectively, and the size of the image forming apparatus 1 is increased thereby.

In Example 2 in FIG. 9A, the load F3 applied to the outer peripheral flat portion of the D-shaped portion 221k of the first shaft diameter portion 221b and the inner peripheral flat portion of the D-shaped hole 222f of the pinion gear 222 can be smaller than the configuration in FIG. 9B. Further, the outer diameter of the second shaft diameter portion to support the pinion gear 222 can be the same as the configuration in FIG. 9B. Therefore just like Example 1, the peripheral speed of the gear teeth portion of the pinion gear can be decreased, and an increase in the operation sound can be suppressed, while power can still be transmitted with high load. Further, by using the driving unit 20 the same as Embodiment 1, a number of gear teeth Z1 of the first driving input gear 24 and a number of gear teeth Z2 of the branching gear 23 need not be increased respectively. Therefore the above mentioned image distortion of the driving system up to the pinion gear 222 and the branching gear 23 can be cancelled, and the size of the image forming apparatus 1 is not increased. Furthermore, driving transmission can be performed without using the parallel pin 27 of Example 1, hence a number of components can be reduced.

As described above, in Example 2, the first shaft diameter portion 221b and the second shaft diameter portion 221c are disposed on the motor shaft 221a, the D-shaped portion 221k is disposed in the first shaft diameter portion 221b, and the D-shaped hole 222f matching with the D-shaped portion 221k is disposed in the pinion gear 222. Thereby the effect similar to Example 1 can be acquired. In Example 2, the parallel pin 27 is unnecessary, hence a number of components can be reduced.

Whereas the present invention has been described with reference to a specific embodiment, the present invention is not limited to the above embodiment. For example, the shapes of the D-shaped portion 221k of the first shaft diameter portion 221b and the D-shaped hole 222f of the first portion 222b1 are not limited to a D shape, and may be an I shape that cuts two surfaces, for example, as long as the rotation of the pinion gear 222, with respect to the motor shaft 221a, can be restricted by the contact of [these portions].

According to the present disclosure, in the image forming apparatus having a driven member which is rotary-driven by power transmitted from a drive source, the strength of the output shaft can be ensured to be operated with high torque, while preventing an increase of the size of the gear, which is mounted on the output shaft of the driving source.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-131867, filed on Aug. 22, 2022, which is hereby incorporated by reference herein in its entirety.

What is claimed is:

1. An image forming apparatus configured to form an image on a recording material, comprising:
   a driving source including an output shaft that outputs power to be transmitted to a driven member, the output shaft including (i) a large diameter portion having a first outer diameter and (ii) a small diameter portion having a second outer diameter that is smaller than the first outer diameter;
   a first gear including (i) a first portion provided with a first opening having a first diameter and (ii) a second portion provided with a second opening having a second diameter that is smaller than the first diameter, and (iii) gear teeth formed on an outer peripheral surface of the second portion, the first gear being mounted on the output shaft such that the large diameter portion is inserted into the first opening and the small diameter portion is inserted into the second opening; and a second gear that engages with the gear teeth of the first gear and is driven by the first gear, wherein rotation of the first gear with respect to the output shaft is restricted by at least a part of the large diameter portion.

2. The image forming apparatus according to claim 1, wherein a difference between a diameter of a root circle of the gear teeth and the second diameter is at least 2 mm and not more than 3 mm.

3. The image forming apparatus according to claim 2, wherein a length determined by subtracting the first outer diameter from the diameter of the root circle is less than 2 mm.

4. The image forming apparatus according to claim 3, wherein a material of the first gear is resin.

5. The image forming apparatus according to claim 2, wherein a material of the first gear is resin.

6. The image forming apparatus according to claim 1, wherein:
the driving source includes a bearing that rotatably supports the output shaft, and
an outer diameter of the output shaft in a portion supported by the bearing is the same as the first outer diameter.

7. The image forming apparatus according to claim 1, wherein the first diameter is larger than the first outer diameter such that there is a gap between an inner peripheral surface that forms the first opening of the first portion and the large diameter portion.

8. The image forming apparatus according to claim 7, wherein an inner peripheral surface that forms the second opening of the second portion is in contact with the small diameter portion.

9. The image forming apparatus according to claim 8, wherein the small diameter portion is press-fitted in the second opening.

10. The image forming apparatus according to claim 1, wherein a radius of a corner at a boundary between the large diameter portion and the small diameter portion increases along a rotational axis of the output shaft in a direction from the small diameter portion to the large diameter portion.

11. The image forming apparatus according to claim 1, further comprising:
a pin,
wherein the large diameter portion is provided with a through hole that penetrates the output shaft in a direction intersecting with a rotational axis of the output shaft,
wherein the pin is inserted into the through hole such that the pin protrudes from the through hole, and
wherein the first portion includes an engaging portion that engages with the pin protruding from the through hole such that the rotation of the first gear with respect to the output shaft is restricted.

12. The image forming apparatus according to claim 11, wherein the pin is longer than the length of the through hole.

13. The image forming apparatus according to claim 1, wherein:
the large diameter portion includes an outer peripheral flat portion, and a distance between the outer peripheral flat portion and a rotational axis of the output shaft is shorter than a half the length of the first outer diameter, and
the first portion includes an inner peripheral flat portion that is in contact with the outer peripheral flat portion such that the rotation of the first gear with respect to the output shaft is restricted.

14. The image forming apparatus according to claim 13, wherein a distance between the rotational axis and the outer peripheral flat portion is longer than a half the length of the second outer diameter.

15. The image forming apparatus according to claim 1, wherein:
the driven member includes an image bearing member, and the image bearing member is exposed by an exposure apparatus at an exposure position, and
the first gear rotates for an integral number of times while the image bearing member rotates from the exposure position to a transfer position at which a developer image is transferred to a transfer target material.

16. The image forming apparatus according to claim 15, wherein a rotation angle of the image bearing member rotating from the exposure position to the transfer position is not 180°.

* * * * *